United States Patent
Chou et al.

(10) Patent No.: US 8,373,573 B2
(45) Date of Patent: Feb. 12, 2013

(54) DISPLAY SYSTEM ADAPTING TO 3D TILTING ADJUSTMENT

(75) Inventors: Hsu-Chi Chou, Taipei (TW); Li-Jen Chao, Taipei County (TW); Chih-Heng Chiu, Taipei (TW); Chung-Won Shu, Taipei (TW)

(73) Assignee: Transcend Information, Inc., NeiHu Dist, Taipei (TW)

( * ) Notice: Subject to any disclaimer, the term of this patent is extended or adjusted under 35 U.S.C. 154(b) by 494 days.

(21) Appl. No.: 12/815,426

(22) Filed: Jun. 15, 2010

(65) Prior Publication Data

US 2011/0304472 A1    Dec. 15, 2011

(51) Int. Cl.
| | |
|---|---|
| G08B 21/00 | (2006.01) |
| G06T 15/00 | (2011.01) |
| G09G 5/00 | (2006.01) |
| H04N 13/04 | (2006.01) |

(52) U.S. Cl. ............ 340/689; 340/666.1; 345/419; 345/659; 348/51; 348/E13.075

(58) Field of Classification Search ............ 340/6.1, 340/3.7–3.71, 5.3–5.33, 500–693.12, 689, 340/686.1; 345/7–9, 419, 619–659; 348/51, 348/E13.75
See application file for complete search history.

(56) References Cited

U.S. PATENT DOCUMENTS

| | | | | |
|---|---|---|---|---|
| 7,190,518 | B1 * | 3/2007 | Kleinberger et al. | 359/465 |
| 2002/0039073 | A1 * | 4/2002 | Ben-Ari et al. | 340/980 |
| 2006/0022808 | A1 * | 2/2006 | Ito et al. | 340/425.5 |
| 2006/0082542 | A1 * | 4/2006 | Morita et al. | 345/156 |
| 2006/0282204 | A1 * | 12/2006 | Breed | 701/49 |
| 2008/0129723 | A1 * | 6/2008 | Comer et al. | 345/419 |
| 2009/0261985 | A1 * | 10/2009 | Nagasawa et al. | 340/825.69 |
| 2009/0280901 | A1 * | 11/2009 | Casparian et al. | 463/37 |
| 2010/0007582 | A1 * | 1/2010 | Zalewski | 345/8 |
| 2010/0039353 | A1 * | 2/2010 | Cernasov | 345/8 |
| 2010/0225743 | A1 * | 9/2010 | Florencio et al. | 348/46 |
| 2010/0240454 | A1 * | 9/2010 | Xiao | 463/30 |
| 2011/0304472 | A1 * | 12/2011 | Chou et al. | 340/689 |
| 2012/0098931 | A1 * | 4/2012 | Wirtz | 348/43 |
| 2012/0176482 | A1 * | 7/2012 | Border et al. | 348/51 |
| 2012/0176483 | A1 * | 7/2012 | Border et al. | 348/54 |

FOREIGN PATENT DOCUMENTS

TW    I246586    1/2006

* cited by examiner

*Primary Examiner* — Daniel Wu
*Assistant Examiner* — Kam Ma
(74) *Attorney, Agent, or Firm* — Winston Hsu; Scott Margo

(57) ABSTRACT

A display system utilizes a tilting sensor in a viewing device to transmit a wireless signal containing tilting information to a display device when a person who puts on the viewing device has tilting movements about an axis that connects between the viewing device and the display device. The display device adjusts a multimedia content displayed on a panel according to the tilting information by physically rotating the panel about the same axis or rotating the multimedia content about the same axis before the content is displayed on the panel to synchronize with the tilting angle of the viewing device.

10 Claims, 3 Drawing Sheets

DISPLAY SYSTEM ADAPTING TO 3D TILTING ADJUSTMENT

BACKGROUND OF THE INVENTION

1. Field of the Invention

The invention relates to a display system, and more particularly, to a 3D tilting adjustable display system where a display device rotates the display content according to a viewing device's tilting angle.

2. Description of the Prior Art 3D displaying technology is getting popular in multimedia market as it is earning more and more opportunity to be visible in movies, video games, or any present multimedia applications. Due to the particular 3D built-up technology, 3D applications requires a dedicated goggle with shutter component in order to transform the presented two partially overlapped images into a simulated three dimensional object that can be recognized by human eyes and brain.

And since the multimedia content is made and presented for the display device that the two parts of the uncombined images, for the left eye and for the right eye respectively, are always horizontally aligned, people who wear the 3D dedicated goggle and watch the 3D multimedia content should always keep their heads upright, or their eyes horizontal, so that the two parts of the uncombined images can be correctly shuttered and processed by the 3D goggle. Without such standard and required position, people will no longer enjoy the 3D effect, even when they do put on the 3D goggle. It means that any none horizontal position of the 3D goggle can not function properly, given the 3D display device is, in a most common way, placed or presents the multimedia content on a horizontal basis.

SUMMARY OF THE INVENTION

The invention provides a display system including a viewing device and a display device. The viewing device includes a tilting sensor and a transmitter. The tilting sensor generates tilting information of the viewing device according to an extending direction of the viewing device relative to a horizontal direction. The transmitter transmits a wireless signal containing the tilting information. The display device includes a panel, a first receiver, a second receiver, a third receiver, and a mechanical rotation component. The first receiver receives the wireless signal from the transmitter. The display device is capable of adjusting a multimedia content displayed thereon according to the tilting information. The first receiver, the second receiver, and the third receiver locate at three distinct locations of the panel for receiving the wireless signal of the viewing device to position the viewing device. The mechanical rotation component rotates the panel about a first axis and a second axis respectively according to the wireless signal received by the first receiver, the second receiver, and the third receiver, and rotates the panel about a third axis according to the tilting information. The first axis, the second axis, and the third axis are perpendicular to one another in space and the panel of the display device is rotated by the mechanical rotation component about the first axis and the second axis to directly face the viewing device.

The invention also provides a viewing device for viewing a 3D multimedia content of a display device. The viewing device includes a first lens and a second lens aligning along an extending direction, a tilting sensor for generating tilting information according to the extending direction of the viewing device relative to a horizontal direction, and a transmitter for transmitting a wireless signal containing the tilting information for being received by the display device to adjust a multimedia content displayed thereon according to the tilting information. The viewing device is capable of being positioned by the display device that uses a mechanical rotation component for rotating its panel about a first axis and a second axis respectively according to the position of the viewing device to directly face the viewing device, and the first axis is perpendicular to the second axis in space.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
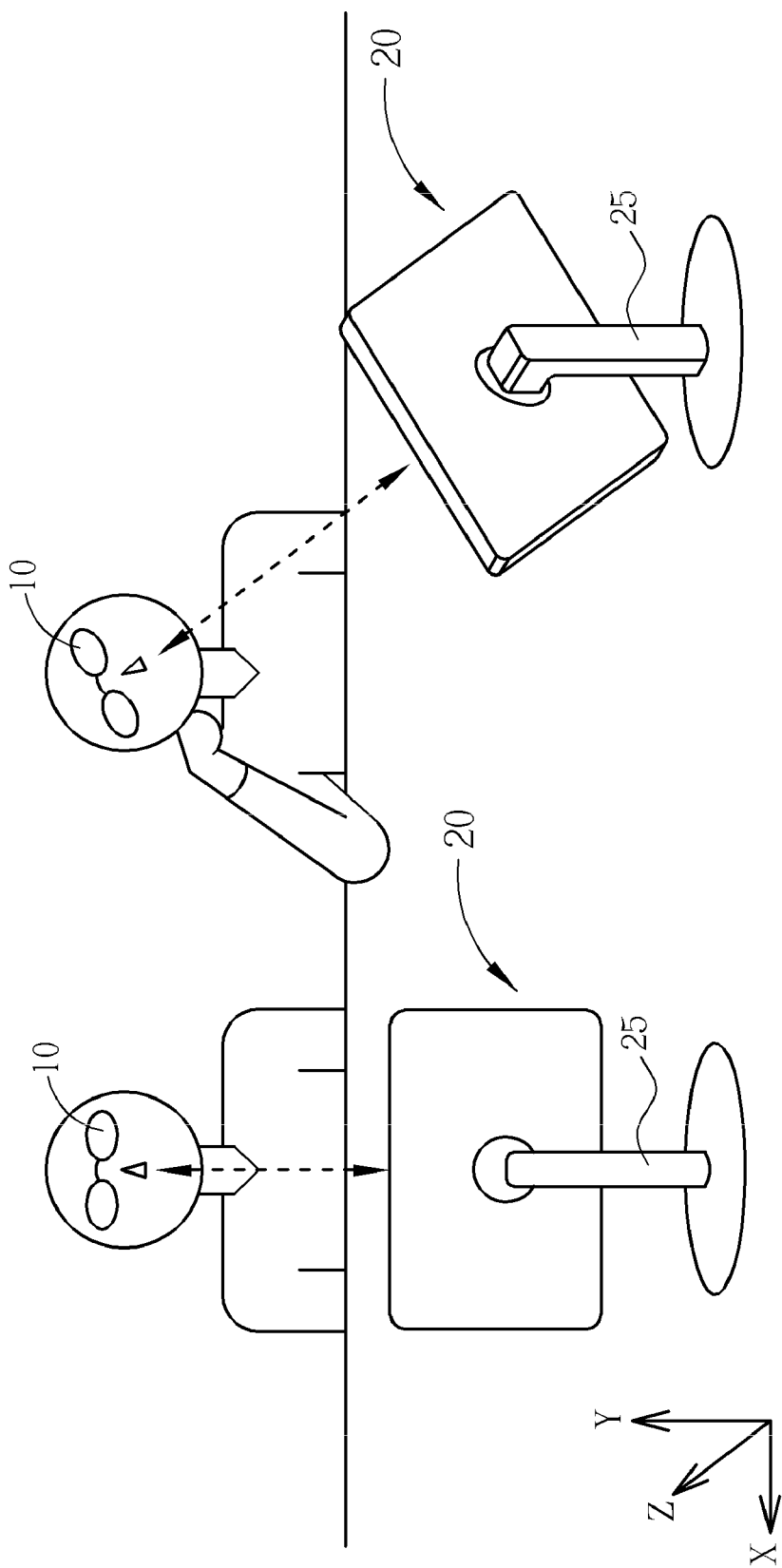
FIG. 1 is a schematic diagram showing operations of a display system according to the invention.

FIG. 1 illustrates an embodiment of a display system according to the invention, including a viewing device 10 and a display device 20, which can always provide a user who wears the viewing device 10 a best and correct viewing angle of the multimedia content displayed on the display device 20. For the left part illustration of FIG. 1, the user who wears the viewing device 10 is positioned right in front of the display device 20 and the display device 20 directly faces the user in a common sense. For the right part illustration of FIG. 1, the user moves somewhat left from the original place, also tilting his head and the viewing device 10 toward left. The display device 20 then rotates, by use of a rotation component 25, toward left until the panel of the display device 20 faces directly toward the viewing device 10. Meanwhile, the display device 20 also rotates about a direction, which is defined as the connecting line $L_3L_4$ between the display panel and the viewing device 10, to have a tilting angle that are substantially in parallel with the viewing device 10.

Figure 2:
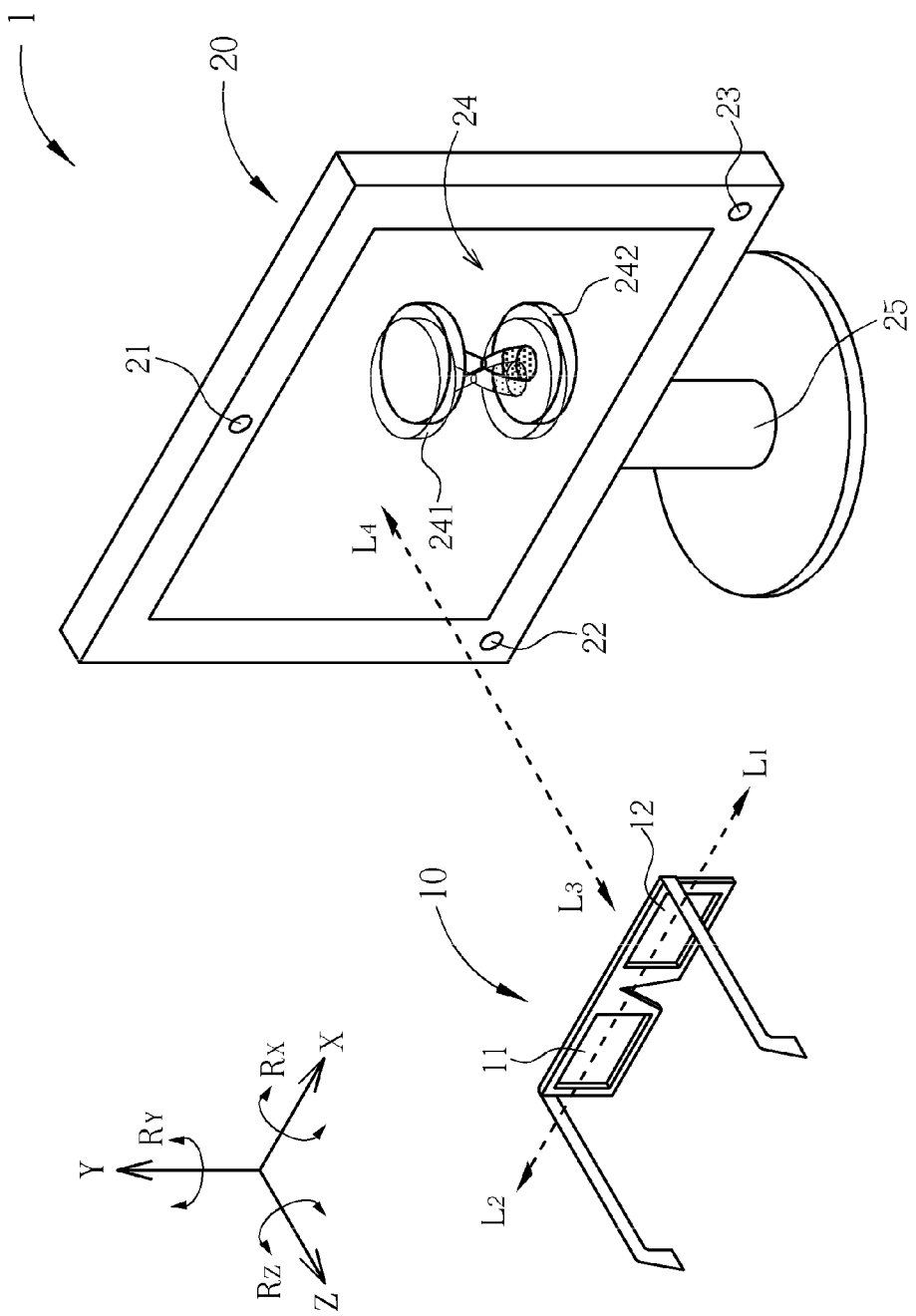
FIG. 2 is a schematic diagram of a viewing device and a display device of the display system of the invention.
Figure 3:
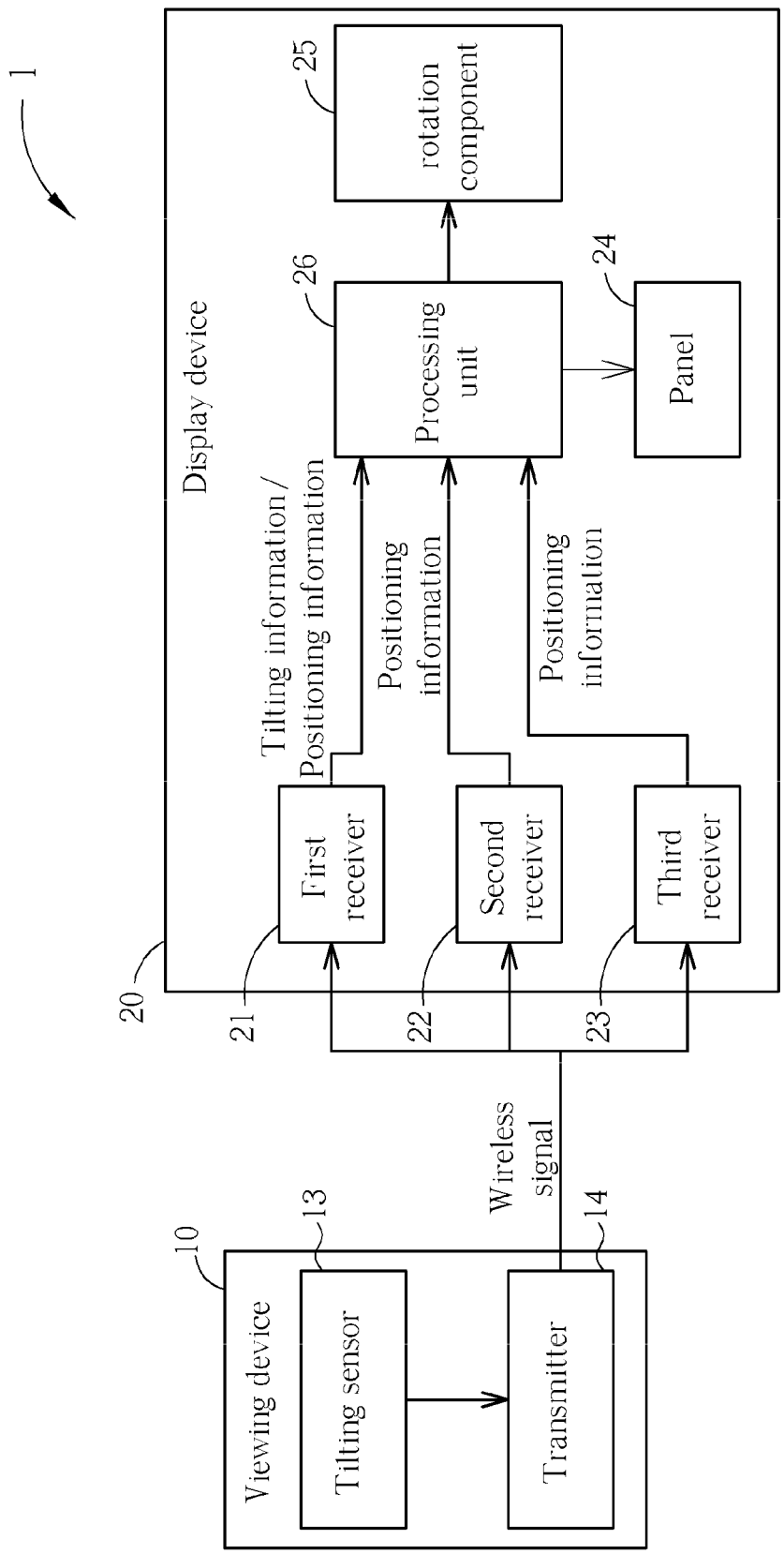
FIG. 3 is a functional diagram of the display system.

Please refer to FIG. 2 and FIG. 3. FIG. 2 is a schematic diagram of the display system 1 and FIG. 3 is a schematic diagram showing the functional structure of the display system 1. For descriptive purpose, the viewing device 10 is preferably a 3D goggle, while it can also be other types of devices that can move or be placed on a moving object so that the display device 20 can 'trace' the viewing device 10 and make corresponding movements. The viewing device 10 includes a first lens 11 and a second lens 12, and when the viewing device 10 is put on a person's face, the first lens 11 provides images for the left eye and the second lens 12 provides image for the right eye. The first lens 11 and the second lens 12 are defined to be aligning along an extending direction $L_1L_2$, and more specifically, the extending direction $L_1L_2$ represents a substantially parallel direction, or the same orientation, with the alignment of the two human eyes of those who put on the viewing device 10. The viewing device 10 also includes a tilting sensor 13, practically a gyroscope utilizing MEMS technology that built in the case of the viewing device 10. The tilting sensor 13 can detect the tilting angle of the viewing device 10 relative to the horizontal level and provides tilting information. Since the viewing device 10 has the orientation as the extending direction $L_1L_2$, once the person who puts on the viewing device 10 tilts his head, poses his body, or by any move that will cause the extending direction $L_1L_2$ to differ from the horizontal level, the tilting sensor 13 generates the tilting information according to the extending direction of the viewing device 10 relative to the horizontal direction.

The viewing device 10 also includes a transmitter 14 that connects to the tilting sensor 13. Both the transmitter 14 and the tilting sensor 13 are battery-powered and therefore the viewing device 10 further uses a battery, which is not shown or described herein, as the power source. The battery also drives the shuttering of the lens 11, 12 if the viewing device 10 is a 3D goggle. The transmitter 14 may use IR or RFID to constantly broadcast wireless signals, which will be received by receivers on the display device 20. Hence, the viewing device 10 according to the embodiment of the invention uses the transmitter 14 to constantly transmit the wireless signal that contains the tilting information generated by the tilting sensor 13 to the display device 20.

Also for descriptive purpose, the display device 20 is preferably a 3D-ready television that can display a multimedia content on its panel 24. The multimedia content displayed thereon may be static images, dynamic images (movies, animations, etc.), text content, or any present substances that can be displayed and viewed. In this embodiment, a 3D-based image, which is made up with two concurrent images 241, 242 are used as a descriptive example. The left image 241 is designated for the first lens 11 and the right image 242 is designated for the second lens 12, and they are produced and presented to be slightly displaced with each other along the horizontal direction, or the X axis in FIG. 2. The detailed description of the 3D technology, including how they are produced, presented, and processed by the goggle and forming the final 3D image recognized by human brain should be readily obtained and learned by any person skilled in the art and is omitted here for brevity.

The display device 20 further includes a first receiver 21, a second receiver 22, and a third receiver 23, each locating at a distinct location on the panel 24 as one exemplary embodiment can be found in FIG. 2. The three receivers 21, 22, 23 can receive the IR or RFID wireless signals transmitted by the transmitter 14 and provide positioning information for further processing by a processing unit 26 of the display device 20. The display device 20 utilizes a mechanical rotation component 25 connecting to the panel 24 of the display device 20 to rotate the panel 24. In this embodiment, the display device 20 can rotate its panel 24 about the X axis (along the rotational direction Rx), the Y axis (along the rotational direction Ry), and further about the Z axis (along the rotational direction Rz), where the three axes are perpendicular to one another in space. As previously mentioned, the display device 20 can trace/position the viewing device 10 and make corresponding movements.

For example, if the person who puts on the viewing device 10 moves up or down along the Y axis (vertically), the three receivers 21, 22, 23 receive the wireless signal from the viewing device 10, each reporting a different signal strength. The processing unit 26 then processes the data from the receivers 21, 22, 23 and drives the rotation component 25 to rotate about the X axis so that the panel 24 tilts up or down accordingly. If the person who puts on the viewing device 10 moves left or right along the X axis (horizontally), the processing unit 26 then processes the data from the receivers 21, 22, 23 and drives the rotation component 25 to rotate about the Y axis so that the panel 24 turns left or right accordingly. Hence, the display device 20 utilizes the three receivers 21, 22, 23 to accomplish 3-point positioning of the viewing device 10 in space and can rotate the panel 24 of the display device 20 to directly face the viewing device 10. The detailed description of 3-point positioning of an object can be readily obtained and learned by any person skilled in the art and is omitted here for brevity.

If the person who puts on the viewing device 10 tilts his head, poses his body, or by any move that causes the extending direction $L_1L_2$ to differ from the horizontal level, or in other words, the viewing device 10 rotates about the Z axis, the wireless signal received by the first receiver 21 provides the tilting information of the viewing device 10 and the processing unit 26 then processes the data from the first receiver 21 and drives the rotation component 25 to rotate about the Z axis so that the panel 24 is physically rotated until the multimedia content on the panel 24 has substantially the same orientation as the viewing device 10. That means for a 3D content playback environment, rotating the panel 24 about the Z axis synchronous with the viewing device 10 ensures the display system 1 of the invention correct 3D viewing angle for the user.

While the rotation of the multimedia content about the Z axis is accomplished by physically rotating the panel 24 in the illustrative embodiment, the display device 20 of the invention can also adjust the multimedia content displayed on the panel 24 according to the tilting information by first rotating the multimedia content about the Z axis, by use of software rendering, before the multimedia content is outputted on the panel 24. That is, the tilting information received by the first receiver 21 is processed by the processing unit 26 and the processing unit 26 renders the follow-up multimedia content in a software level. Correct 3D viewing angle can be ensured in the display system 1.

The invention discloses the display system that utilizes a tilting sensor in the viewing device to transmit a wireless signal containing tilting information to the display device when the person who puts on the viewing device has tilting movements about an axis that connects between the viewing device and the display device. The display device adjusts the multimedia content displayed on the panel according to the tilting information by physically rotating the panel about the same axis or rotating the multimedia content about the same axis before the content is displayed on the panel to synchronize with the tilting angle of the viewing device.

Those skilled in the art will readily observe that numerous modifications and alterations of the device and method may be made while retaining the teachings of the invention.

What is claimed is:

1. A display system, comprising:
   a viewing device comprising a tilting sensor and a transmitter, the tilting sensor generating tilting information of the viewing device according to an extending direction of the viewing device relative to a horizontal direction, the transmitter transmitting a wireless signal containing the tilting information; and
   a display device, comprising:
      a panel;
      a first receiver for receiving the wireless signal from the transmitter, the display device capable of adjusting a multimedia content displayed thereon according to the tilting information;
      a second receiver and a third receiver, wherein the first receiver, the second receiver, and the third receiver locate at three distinct locations of the panel for receiving the wireless signal of the viewing device to position the display device; and
      a mechanical rotation component for rotating the panel about a first axis and a second axis respectively according to the wireless signal received by the first receiver, the second receiver, and the third receiver, and for rotating the panel about a third axis according to the tilting information;

wherein the first axis, the second axis, and the third axis are perpendicular to one another in space and the panel of the display device is rotated by the mechanical rotation component about the first axis and the second axis to directly face the viewing device;

wherein the extending direction of the viewing device has substantially the same orientation as the two eyes of a person who puts on the viewing device.

2. The display system of claim 1, wherein the display device adjusts the multimedia content displayed thereon by rotating the multimedia content about the third axis and outputting the multimedia content on the panel; wherein the third axis is the direction connecting between the viewing device and the display device.

3. The display system of claim 2, wherein the multimedia content is rendered by use of software 3D rendering before outputted on the panel.

4. The display system of claim 1, wherein the viewing device comprises a first lens and a second lens aligning along the extending direction.

5. The display system of claim 4, wherein the multimedia content is made up with two concurrent images designated for the first lens and the second lens of the viewing device respectively.

6. The display system of claim 1, wherein the viewing device is a 3D goggle and the display device is a 3D-ready (3D-ready means it is capable of displaying 3D content but it surely is also capable of dealing with ordinary media content, and I put such limitation in this dependent claim so that the invention may have a particular subject matter) television.

7. The display system of claim 1, wherein the transmitter is an IR transmitter or an RFID transmitter.

8. A viewing device for viewing a 3D multimedia content of a display device, the viewing device comprising:

a first lens and a second lens aligning along an extending direction;

a tilting sensor for generating tilting information according to the extending direction of the viewing device relative to a horizontal direction; and a transmitter for transmitting a wireless signal containing the tilting information for being received by the display device to adjust a multimedia content displayed thereon according to the tilting information;

wherein the viewing device is capable of positioning the display device that uses a mechanical rotation component for rotating its panel about a first axis and a second axis respectively according to the position of the viewing device to directly face the viewing device, and the first axis is perpendicular to the second axis in space;

wherein the extending direction has substantially the same orientation as the two eyes of a person who puts on the viewing device.

9. The viewing device of claim 8, wherein the viewing device is a 3D goggle.

10. The viewing device of claim 8, wherein the transmitter is an IR transmitter or an RFID transmitter.

* * * * *